June 6, 1933.  M. JOACHIMCZYK  1,913,119
APPARATUS FOR MAKING BLANKS FOR ENVELOPES OR PAPER BAGS
Filed March 17, 1930  5 Sheets-Sheet 1

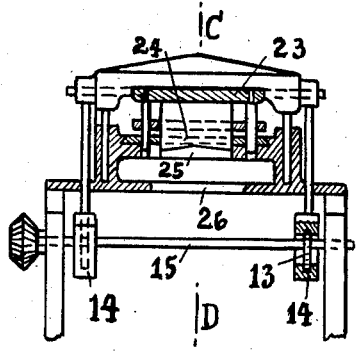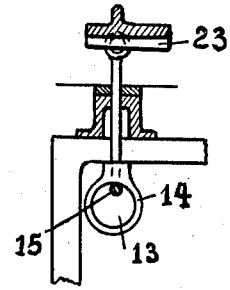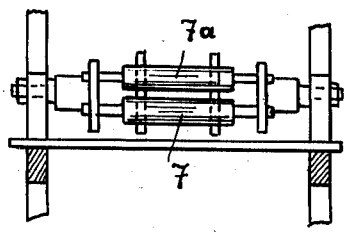

June 6, 1933. M. JOACHIMCZYK 1,913,119
APPARATUS FOR MAKING BLANKS FOR ENVELOPES OR PAPER BAGS
Filed March 17, 1930 5 Sheets-Sheet 3

June 6, 1933.  M. JOACHIMCZYK  1,913,119
APPARATUS FOR MAKING BLANKS FOR ENVELOPES OR PAPER BAGS
Filed March 17, 1930   5 Sheets-Sheet 4
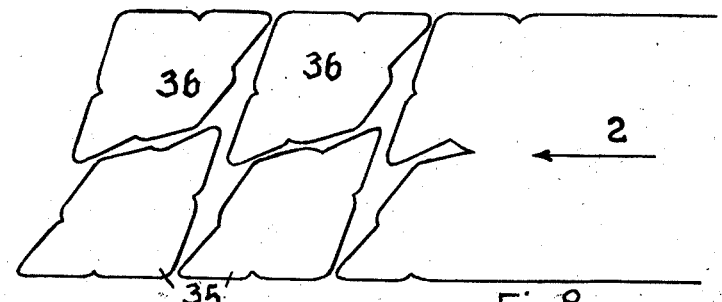
Fig.9   Fig.8.
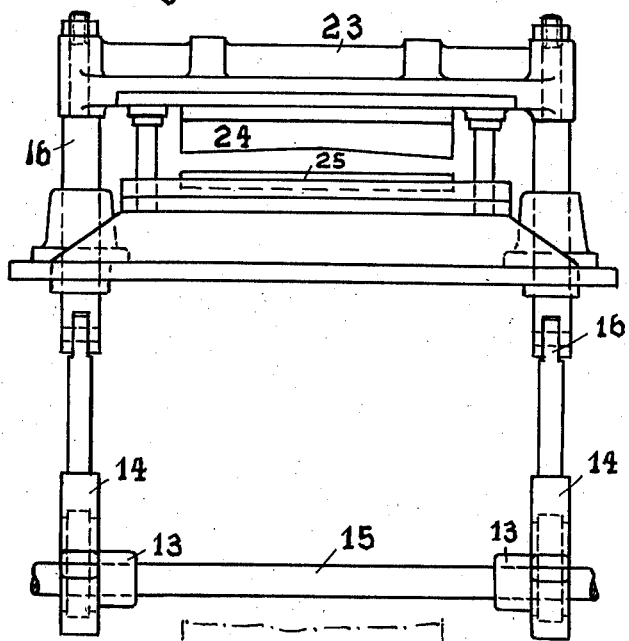
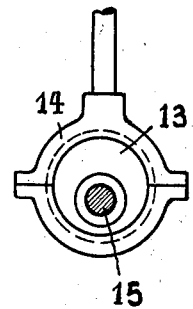
Fig. 11
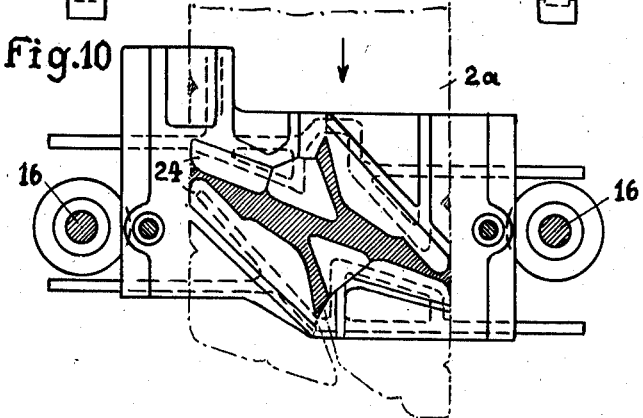
Fig.10
INVENTOR
M. Joachimczyk
By Wm H Reid
Attorney June 6, 1933.   M. JOACHIMCZYK   1,913,119
APPARATUS FOR MAKING BLANKS FOR ENVELOPES OR PAPER BAGS
Filed March 17, 1930   5 Sheets-Sheet 5
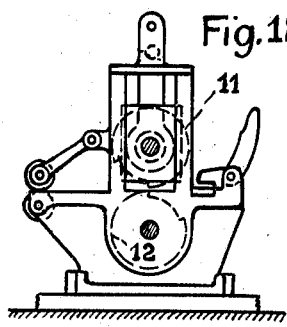
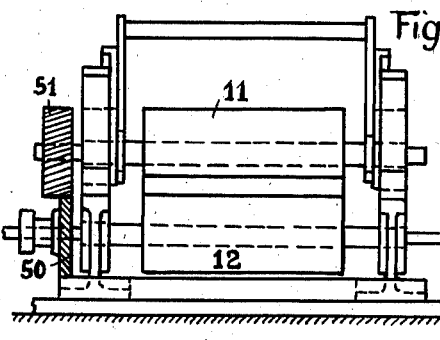
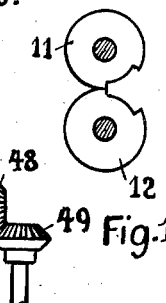
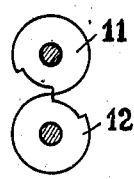
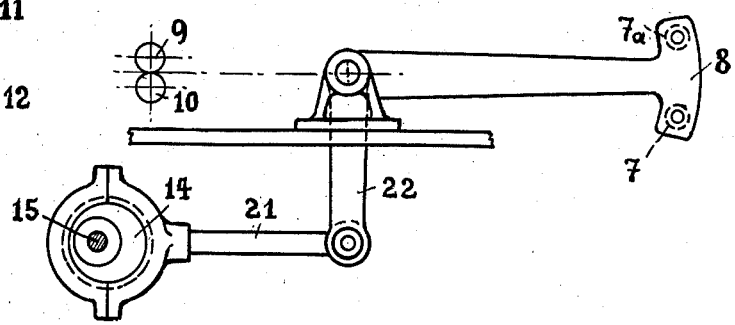
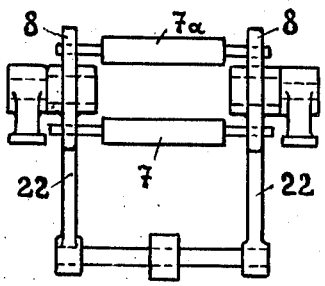
INVENTOR
M. Joachimczyk
By Wm H Reid
Attorney Patented June 6, 1933

1,913,119

UNITED STATES PATENT OFFICE

MARTIN JOACHIMCZYK, OF BERLIN-CHARLOTTENBURG, GERMANY

APPARATUS FOR MAKING BLANKS FOR ENVELOPES OR PAPER BAGS

Application filed March 17, 1930, Serial No. 436,441, and in Germany May 10, 1929.

The object of the apparatus according to the invention is, primarily, to carry out automatically, quickly and reliably the processes which in the known machines for making envelopes, namely cutting the blanks to shape, take up considerable time and involve much waste of material.

The apparatus can also include means for gumming the closing flaps.

The process formerly generally in use consists in bringing plain sheets, obtained from the manufacturers, in layers under the stamping machine in which the contour lines are cut by means of punches. The effective utilization of the material, which is of considerable importance in the manufacture of the envelopes, depends mainly on the ability of the operator who must ensure that the lines cut should be as close as possible together without any overlapping, which would produce faulty stampings and consequently increased waste of paper. But even with the most careful operation, the waste of paper is relatively large, because large waste pieces unavoidably occur at the margin of the sheets.

There is also another very inconvenient drawback in the usual method of working with punches, since the cut sheets are of unequal size, those in the upper layers being larger than those in the lower layers. This makes the further preparation of sheets in the folding machines more difficult, and requires more supervision and adjustment by the operator, so that on that account the whole working process can be hardly effected mechanically.

According to the invention, these difficulties are obviated by a stamping device in which the usual surface, usually made of hard wood, cardboard, bronze or the like to receive the blade of the punch, is replaced by an apertured lower blade which allows the upper blade to pass through it and accordingly shears the material, so that the edges are not damaged and the contour lines are always uniform and sharply outlined.

In this stamping apparatus, certain parts of the web or webs are pressed through the aperture of the lower knife, viz. the blanks themselves, if they are to be used for the manufacture of the envelopes usual in America, or, on the other hand, the waste or superfluous pieces of the paper webs lying between the contours of two blanks, if envelopes of the so-called "cross seam" type are to be made.

By the latter arrangement the important advantage is obtained that the cut sheet or sheets can remain on the work table of the stamping device and from there can be delivered by very simple means to a pile apparatus; if the cut sheets themselves are pressed through the opening of the lower knife, guiding and feeding means are necessary, which should be carefully adapted in view of the very small weight of the sheets and their very small rigidity, in order to avoid faults.

An automatic apparatus is consequently produced in which the blanks drawn from reels of paper, preferably in several superimposed webs, for envelopes or the like, can be constantly worked, exactly cut with the least waste and arranged in piles. Since folding machines, with or without devices for gumming the flaps, are in general use, the new stamping apparatus effectively completes these machines.

In order to increase the output of the stamping device and at the same time to lessen still further the amount of paper wasted, it is advisable to work with wide webs and to construct the stamping apparatus so that at each stroke several blanks lying beside one another, or, however, the waste pieces between these blanks, are cut out. The particular shape of the blanks enables the width of the web to be less than would be represented by the total width of two or more webs required for cutting the blanks out of separate webs for single rows of blanks.

Further details of the subject matter of the invention will be given in the following description of two examples which are diagrammatically represented in the accompanying drawings.

Fig. 2 is a vertical section through the stamping device of Fig. 1.

Fig. 3 is a section on the line C—D of Fig. 2.

Fig. 4 is a front view of the tension regulator of Fig. 1.

Fig. 8 is a plan of two sets of adjacent blanks and the end of the uncut web.

Fig. 9 is a front view of the stamping device and

Fig. 10 is a plan of the same.

Fig. 11 is a side view of the eccentric driving the stamping device.

Fig. 12 is a side view of the step by step feed rolls.

Fig. 13 is a front view therefrom.

Figs. 14 and 15 illustrate two different positions of the step by step rolls.

Fig. 16 is a side view of the tensioning apparatus, from which

Fig. 17 is a front view.

Figure 1:
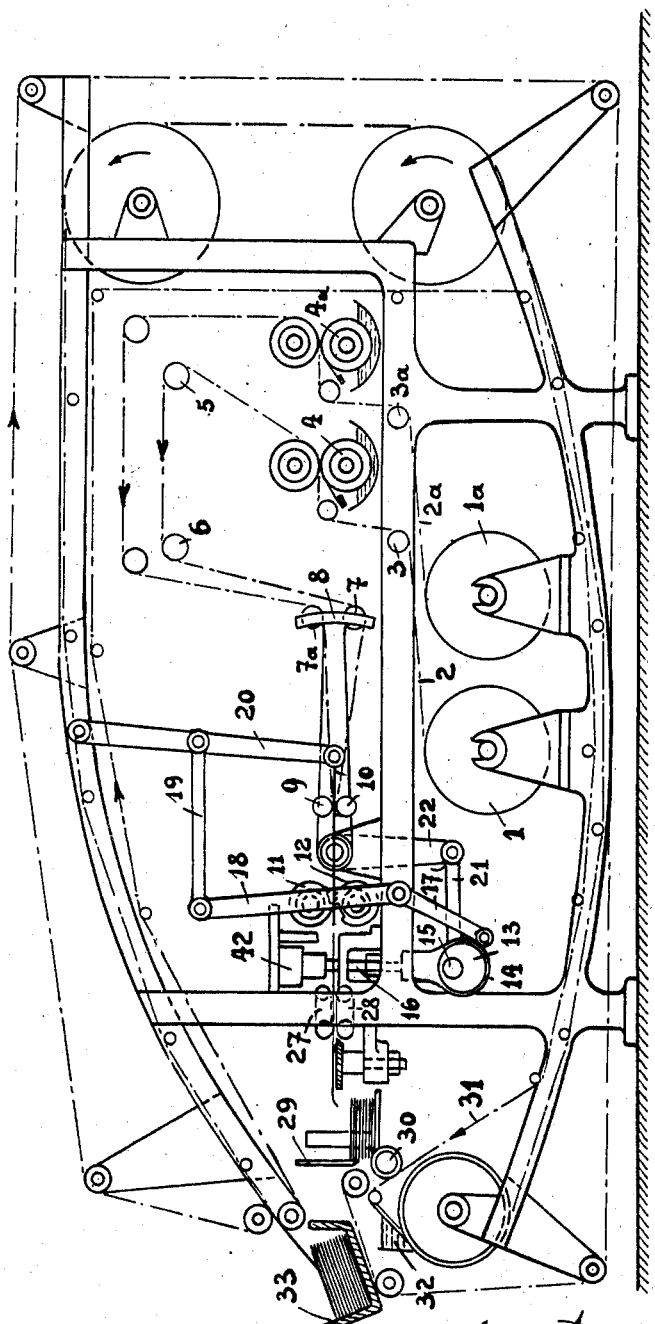
Fig. 1 is a side view of the machine.

In the machine illustrated in Fig. 1, two paper reels 1 and 1a are shown from which the webs 2 and 2a are led over guiding rollers 3 and 3a, to intaglio printing devices 4 and 4a, where they receive first an appropriate impression. The employment of intaglio printing devices has the advantage that the printing rollers serve at the same time as feeding devices for the web. In this way there is no need for separate feeding rollers and at the same time a very exact feed, which keeps the paper webs in register, is also obtained.

The webs then pass over guiding rollers 5 and 6 to rollers 7 and 7a of a tension regulator 8, of which the object and working will be explained later.

The webs are now combined together or superimposed between the rollers 9 and 10 and pass over a pair of feed rollers 11, 12. Both these rollers run continuously and uniformly, but have, however, recesses on their perimeter which partly overlap and feed the web step by step. The position of the rollers 11 and 12 is relatively adjustable, so that the duration of the interruption of the feed, which is necessary for exactly effecting the cut, can be adjusted as required. Two extreme positions are shown by Figs. 14 and 15, the first showing the position of the rolls, when the motion of the web shall be arrested the shortest time possible, whereas the position of the rolls as shown by Fig. 15 enables to extend the duration of the stopping to the greatest extent. The step by step rolls are continuously driven by conical gears 48, 49 and two toothed gears 50, 51 fast on the axles of the two rolls and engaging one another.

The cutting itself is effected by the stamping gear 42 actuated by means of two rods 16 operated by an eccentric strap 14 rotated by a shaft 15.

The same eccentric serves also for the periodic actuation of the tension controller 17, 18, 19, 20 and the tension controller 21, 22, 8, which by a corresponding downward movement takes up the loop formed in the web during the stationary period in the feed of the roller pair 11, 12, so that the web is always uniformly tensioned.

The stamping device itself, which is shown more fully in Fig. 3, consists of a head portion 23 with a blade 24 which passes through a corresponding aperture in the lower blade 25. The contour lines of the upper and lower blade are so formed that only the waste portion of web is cut out and is removed through the opening 26, as will be explained later with reference to Fig. 5. The prepared blanks are led by two conveyer bands 27 and 28 to the pile box 29 which has a slot at its lower front end. Wheels 30 guide the lowest sheets to a tape 31 which leads them to a position 32 for gumming the closing flaps, and then, for the purpose of drying, on a path which encircles the whole machine. The prepared, imprinted, gummed and dried blanks are finally led to a collecting box 33.

Figure 5:
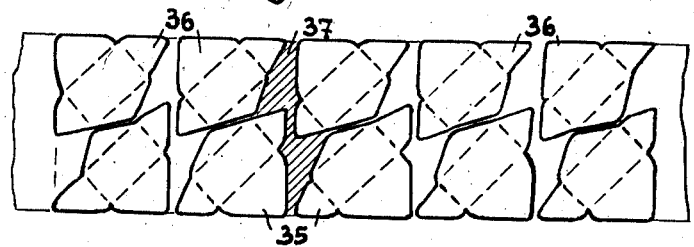
Fig. 5 is a plan of a web for two sets of adjacent blanks.

The distribution of the contour lines of each of two blanks lying beside one another of web of greater width is shown in Fig. 5. At each stroke of the stamping device a waste piece 37 is cut out, leaving two cut blanks 35 and 36.

The web can be less by the piece 37 than twice the width of a web having a single row of blanks to be cut.

Figure 6:
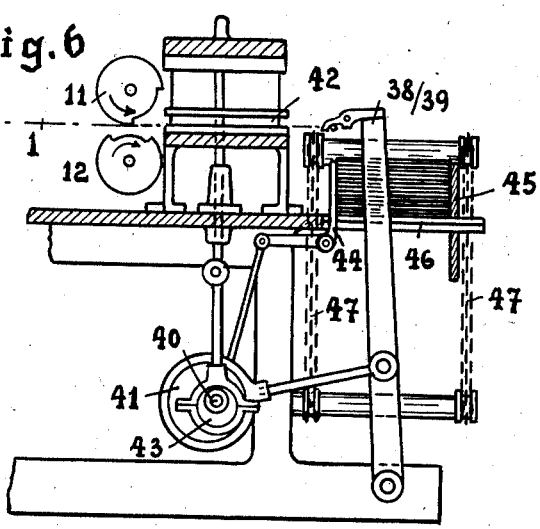
Fig. 6 is a side view of the stamping and piling device for a web according to Fig. 5.
Figure 7:
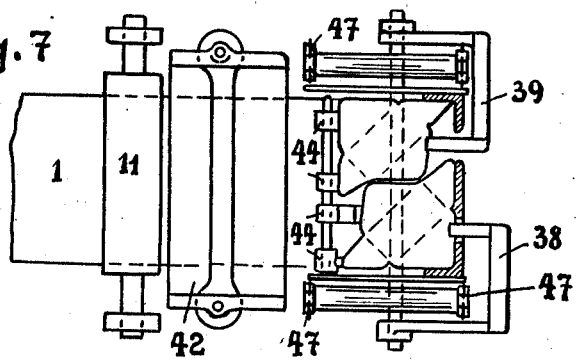
Fig. 7 is a plan of the parts shown in Fig. 6.

The method of feeding the cut blanks according to Fig. 1 is not the most preferable with the web shown in Fig. 5, because the paths of the separate blanks would partly overlap. An improved arrangement, as shown in Figs. 6 and 7, is preferably provided with reciprocating grippers 38, 39 which each seize the blanks lying on the table of the stamping device 42, or a layer of such blanks, and either directly form them into a pile, as represented in the drawings, or conveyer bands lead them for further preparation, as shown in Fig. 1, from the place beyond which there is no danger of any relative displacement of the position of the blanks.

The grippers are operated by a shaft 40 and eccentrics 41. Other eccentrics 43 are arranged on the same shaft which actuates the stamping apparatus 42 and the pile-adjusting devices 44 are also operated from the same shaft.

The adjusting devices 44 push the separate sheets against stop 45. The table 46 on which the pile rests is hung on chains 47, so that it can be lowered, automatically, if necessary, as the height of the pile increases.

I claim:

1. In an apparatus for making blanks for further working into rectangular envelopes with triangular flaps disposed about its four sides, a plurality of paper reels, means for drawing off the paper webs continuously from said reels, a stamping device having cutters and cooperating with means for delivering the blanks to a pile, means for superimposing and feeding the superimposed webs under tension in a step by step motion to the stamping device, the cutters of said device operating at right angles to the web and being arranged so that two adjacent cut-pieces of each of the superimposed webs are simultaneously severed at the same time, the outlines of which fit in one another at three sides, whereas a fourth side corresponds with an outside edge of the web.

2. In an apparatus for making blanks for further working into rectangular envelopes with triangular flaps disposed about its four sides a plurality of paper reels, means for drawing the paper webs continuously from said reels, a tension controller having rollers for tensioning and other rollers for superimposing the webs, said lever-actuated tension controller being so controlled, that the rollers mounted thereon release for a short time the webs for lateral adjustment at the beginning of its periodic feed, intermittently feeding rollers provided with peripheral recesses, a stamping device with blades operating at right angles to the web, said blades being arranged in such a manner that two adjacent cut-pieces of each of the superimposed webs are simultaneously severed at the same time, the outlines of which fit in one another at three sides, whereas a fourth side corresponds with an outside edge of the web, oscillating grippers for feeding further a layer of blanks, said grippers cooperating with pile adjusters and being operated by excentrics, that are mounted on the same shaft as the excentrics which operate the tension controller, the pile adjusters and the stamping device.

In testimony whereof I affix my signature.

MARTIN JOACHIMCZYK.